(12) United States Patent
Tudoran et al.

(10) Patent No.: US 12,314,264 B2
(45) Date of Patent: May 27, 2025

(54) SYSTEM FOR EMBEDDING STREAM PROCESSING EXECUTION IN A DATABASE

(71) Applicant: Huawei Cloud Computing Technologies Co., Ltd., Gui'an (CN)

(72) Inventors: Radu Tudoran, Munich (DE); Alexander Nozdrin, Munich (DE); Stefano Bortoli, Munich (DE); Mohamad Al Hajj Hassan, Munich (DE); Cristian Axenie, Munich (DE); Hailin Li, Shenzhen (CN); Goetz Brasche, Munich (DE)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 303 days.

(21) Appl. No.: 17/402,388

(22) Filed: Aug. 13, 2021

(65) Prior Publication Data
US 2021/0374144 A1   Dec. 2, 2021

Related U.S. Application Data

(63) Continuation of application No. PCT/EP2019/053795, filed on Feb. 15, 2019.

(51) Int. Cl.
*G06F 16/25* (2019.01)
*G06F 16/242* (2019.01)
(Continued)

(52) U.S. Cl.
CPC ...... *G06F 16/24568* (2019.01); *G06F 16/244* (2019.01); *G06F 16/2456* (2019.01); *G06F 16/2457* (2019.01)

(58) Field of Classification Search
CPC ............... G06F 16/244; G06F 16/2456; G06F 16/2457; G06F 16/24568
See application file for complete search history.

(56) References Cited

U.S. PATENT DOCUMENTS 7,849,507 B1 * 12/2010 Bloch ................... H04L 63/168
                                                                     726/22
8,805,819 B1    8/2014 Black
(Continued)

FOREIGN PATENT DOCUMENTS

CN         105308592 A        2/2016
CN         109074377 A       12/2018

OTHER PUBLICATIONS

Ji et al., "Optimization of Continuous Queries in Federated Database and Stream Processing Systems," https://www.slideshare.net/zbigniew.jerzak/2015-0305-btwtalkv2, pp. 1-14 (Mar. 16, 2015).
(Continued)

*Primary Examiner* — Tarek Chbouki
(74) *Attorney, Agent, or Firm* — Leydig, Voit & Mayer, Ltd.

(57) ABSTRACT

A database management system, comprising: a storage adapted for storing: a plurality of data objects organized according to a data model, and a plurality of stream operator wrappers each wrapping a stream operator and having at least one port for receiving, via a network, instructions for: scheduling activation of the wrapped stream operator, connecting the wrapped stream operator with another stream operator wrapped by another of the plurality of stream operator wrappers, and/or deploying the wrapped stream operator; a processing circuitry for executing the plurality of stream operator wrappers.

17 Claims, 6 Drawing Sheets

(51) Int. Cl.
*G06F 16/2455* (2019.01)
*G06F 16/2457* (2019.01)

(56) References Cited

U.S. PATENT DOCUMENTS

| | | | | |
|---|---|---|---|---|
| 9,183,339 | B1* | 11/2015 | Shirazi | G06F 30/327 |
| 9,607,045 | B2 | 3/2017 | Fisher et al. | |
| 10,180,861 | B2* | 1/2019 | Raghavan | G06F 9/54 |
| 10,389,764 | B2* | 8/2019 | Johnson | H04L 65/1069 |
| 2001/0056492 | A1* | 12/2001 | Bressoud | H04L 9/40 |
| | | | | 709/227 |
| 2002/0133504 | A1* | 9/2002 | Vlahos | G06F 16/256 |
| 2004/0243550 | A1* | 12/2004 | Gu | G06F 16/24556 |
| 2007/0067274 | A1* | 3/2007 | Han | G06F 16/2456 |
| 2010/0030896 | A1* | 2/2010 | Chandramouli | G06F 16/24568 |
| | | | | 709/224 |
| 2012/0078868 | A1* | 3/2012 | Chen | G06F 16/24568 |
| | | | | 707/706 |
| 2012/0324453 | A1* | 12/2012 | Chandramouli | G06F 16/24568 |
| | | | | 718/100 |
| 2014/0032525 | A1* | 1/2014 | Merriman | G06F 16/24556 |
| | | | | 707/713 |
| 2015/0248461 | A1* | 9/2015 | Theeten | G06F 16/24524 |
| | | | | 707/718 |
| 2015/0317364 | A1 | 11/2015 | Branson et al. | |
| 2015/0372882 | A1* | 12/2015 | Qian | G06F 9/5061 |
| | | | | 709/219 |
| 2016/0180022 | A1* | 6/2016 | Paixao | H04L 63/1408 |
| | | | | 705/3 |
| 2017/0060947 | A1* | 3/2017 | Zhang | G06F 16/24542 |
| 2017/0124151 | A1* | 5/2017 | Ji | G06F 16/24542 |
| 2018/0227280 | A1 | 8/2018 | Barsness et al. | |
| 2018/0300381 | A1* | 10/2018 | Horowitz | G06F 16/258 |
| 2019/0042290 | A1* | 2/2019 | Bailey | G06F 9/5077 |
| 2019/0124007 | A1* | 4/2019 | Cook | H04L 63/0428 |
| 2019/0132387 | A1* | 5/2019 | Singh | H04L 67/1095 |
| 2019/0207990 | A1* | 7/2019 | Cook | H04L 65/1069 |
| 2019/0251081 | A1* | 8/2019 | Branson | G06F 16/24568 |
| 2019/0377817 | A1* | 12/2019 | McCluskey | G06F 16/258 |
| 2020/0092314 | A1* | 3/2020 | Mital | G06F 21/6227 |
| 2020/0117757 | A1* | 4/2020 | Yanamandra | G06F 16/9027 |

OTHER PUBLICATIONS

"How Continuous Querying Works," Apache Geode, https://geode.apache.org/docs/guide/114/developing/continuous_querying/how_continuous_querying_works.html, Total 2 pages (2021).

Ji et al., "Optimization of Continuous Queries in Federated Database and Stream Processing Systems," BTW, Computer Science, pp. 403-422 (2015).

* cited by examiner

SYSTEM FOR EMBEDDING STREAM PROCESSING EXECUTION IN A DATABASE

CROSS-REFERENCE TO RELATED APPLICATIONS

This application is a continuation of International Application No. PCT/EP2019/053795, filed on Feb. 15, 2019, the disclosure of which is hereby incorporated by reference in its entirety.

TECHNICAL FIELD

The present disclosure relates to a database management system for embedded stream processing and a method for scheduling data processing at a database management system.

BACKGROUND

Data streams are sequences of events that are generated by various sources (e.g. sensors, machines, or humans) in a chronologically ordered fashion. Stream processing involves applying business analytics over events in data streams. A typical approach to stream processing assumes accumulating such events within certain boundaries at a given time and applying business analytics on a resulting collection. Streaming applications often require accessing, processing, and combining online dynamic data with static data stored in external storage media in systems, such as relational databases.

Bypassing boundaries between a streaming data system and databases, and moving data between them, may create bottlenecks in a real-time processing pipeline, which may apply to multiple scenarios such as fraud prevention, outlier detection, or monitoring, in which complex pattern matching processes must be executed with very low latencies, while combining data from different applications and data sources.

In order to reduce bottlenecks, modern database systems, besides providing support for data queries on data which is typically stored in tables, also support embedding of stored procedures (i.e., single thread programs applied on the data within the same memory space of the database management system). The purpose of stream procedures in databases is to extend the query computation capacity to arbitrary and general purpose logic defined by the application developer. While this logic could be executed outside of the database system, it would typically require several interactions and data transfer between the database and the application execution engine, thus reducing performance of data processing. To avoid such inefficiency, the developer defines a store procedure, deploys the store procedure in the database, and invokes the store procedure as part of a query when required. Therefore, store procedures enable speed-up processing of data within the database structures that stores the data. Modern distributed streaming engines define applications as a distributed collection of stream operators executed as single thread processes interconnected to form a direct acyclic graph (i.e., a streaming topology). Such structures pre-define data flow among the operators, which may be deployed and executed in different machines. Thus, streaming engines define and implement mechanisms to partition and distribute the stream of data among operators with a purpose of optimizing throughput and latency.

SUMMARY

It is an object of some embodiments of the present disclosure to provide a system and a method for database management by embedded stream processing.

The foregoing and other objects are achieved by the features of the independent claims. Further implementation forms are apparent from the dependent claims, the description and the figures.

According to a first aspect of the disclosure, a system is provided, comprising: a stream engine; a database management sub-system comprising a processing circuitry and a storage adapted for storing: a plurality of data objects organized according to a data model, and a plurality of stream operator wrappers each wrapping a stream operator and having at least one port; wherein in use, at least some of the plurality of stream operator wrappers are executed by the processing circuitry for receiving, from the stream engine and via the at least one port and a network, instructions for: scheduling activation of the wrapped stream operator, connecting the wrapped stream operator with another stream operator wrapped by another of the plurality of stream operator wrappers, and/or deploying the wrapped stream operator. The system provides a framework for hybrid stream processing, combining processing strengths of both stream engines and database management systems.

According to a second aspect of the disclosure, a database management system, comprising: a storage adapted for storing: a plurality of data objects organized according to a data model, and a plurality of stream operator wrappers each wrapping a stream operator and having at least one port for receiving, via a network, instructions for: scheduling activation of the wrapped stream operator, connecting the wrapped stream operator with another stream operator wrapped by another of the plurality of stream operator wrappers, and/or deploying the wrapped stream operator; and a processing circuitry for executing the plurality of stream operator wrappers. Modern database management systems provide a wide range of functionality in enabling internal deployment of stored procedures by an external source, which are implemented as stream operator wrappers.

According to a third aspect of the disclosure, a stream engine, comprising: an interface adapted to receive a plurality of messages from a plurality of stream operator wrappers executed on a remote database management system storing a plurality of data objects and the plurality of stream operator wrappers, each of the plurality of messages is indicative of an outcome of executing a stream operator wrapped by one of the plurality of stream operator wrappers; a processing circuitry adapted to execute a policy for scheduling or interconnecting at least some of a plurality of stream operators wrapped in the plurality of stream operator wrappers according to data in the plurality of messages. The stream engine may control real time stream processing of data stored within the database management system by communicating with the stream operator wrappers deployed within the database management system.

According to a fourth aspect of the disclosure, a method for executing a database management system, comprising: storing a plurality of data objects organized according to a data model, and a plurality of stream operator wrappers each wrapping a stream operator and having at least one port for receiving, via a network, instructions for: scheduling activation of the wrapped stream operator, connecting the wrapped stream operator with another stream operator wrapped by another of the plurality of stream operator wrappers, and/or deploying the wrapped stream operator; and executing the plurality of stream operator wrappers. The stream operator wrappers support different messaging options by various ports, which enables execution of different streaming plans and topologies by the stream engine, and is adaptable to changes in real time by the stream engine.

According to a fifth aspect of the disclosure, a method of scheduling data processing at a database management system by a stream engine, comprising: receiving a plurality of messages from a plurality of stream operator wrappers executed on a remote database management system storing a plurality of data objects and the plurality of stream operator wrappers, each of the plurality of messages is indicative of an outcome of executing a stream operator wrapped by one of the plurality of stream operator wrappers; and executing a policy for scheduling a plurality of stream operators wrapped in the plurality of stream operator wrappers according to data in the plurality of messages. Maintaining real time communication between deployed stream operator wrappers and the stream engine provides flexibility in adapting to dynamic changes during streaming, such as bottlenecks, network malfunctions, and varying client requirements.

With reference to the second aspect, optionally, each of the plurality of stream operator wrappers has an entry point for receiving a data flow from another of the plurality of stream operator wrappers which is interconnected thereto. Supporting networking of stream operator wrappers enables the stream engine to distribute part of a stream processing logic within a database management system, or within a distributed database management system.

With reference to the second aspect, optionally, some of the plurality of stream operator wrappers are executed simultaneously for processing a data flow of a common thread. Coordination of parallel execution of stream operator wrappers may improve streaming efficiency.

With reference to the second aspect, optionally, the stream operator is a member of a group consisting of the following operators: map, flatmap, reduce, join, window, filter, processfunction, groupby, keyby, shuffle, group, iterate, match, and aggregate. Implementation of commonly used database operators maximizes usage of database processing functionality by the stream engine.

With reference to the second aspect, optionally, the database management system is part of a distributed stream processing pipeline. Distributed stream processing pipelines are commonly implemented streaming architectures.

With reference to the second aspect, optionally, the processing circuitry executes each of at least some of the plurality of stream operator wrappers for combining a logic defined by the respective stream operator and some of the plurality of data objects. Each stream operator wrapper may implement part of a processing logic, and when combined, may function as a distributed stream processing mechanism.

With reference to the second aspect, optionally, the instructions are received for implementing a stream processing pipeline integration. This enables integration of multiple data sources into a stream processing pipeline.

With reference to the second aspect, optionally, the instructions are received for controlling a job execution for enabling coordination and distribution of jobs according to a stream processing plan. This enables the stream engine to control stream processing via instructions sent to the stream operator wrappers within the deployed database stored procedures.

With reference to the second aspect, optionally, the stream processing plan is for building a stream application topology. The stream engine may deploy a stream application topology according to known streaming requirements.

With reference to the second aspect, optionally, the stream operator is a single thread application defining logic for processing data from the plurality of data objects.

With reference to the second aspect, optionally, the stream operator is a user defined function. A user defined function may implement a user defined data mining requirement directly within a database management system, thus improving streaming efficiency.

With reference to the second aspect, optionally, the at least one port comprising at least one output port for outputting data to a remote stream engine that supervises the execution of the respective stream operator accordingly.

With reference to the third aspect, optionally, the processing circuitry is adapted to instruct a deployment of one or more of the plurality of stream operators by sending an indication to one or more of the plurality of stream operator wrappers via the network. Partially implementing deployment of stream operators by stream operator wrappers may reduce communications between the stream engine and the database management system, thus increasing overall efficiency.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
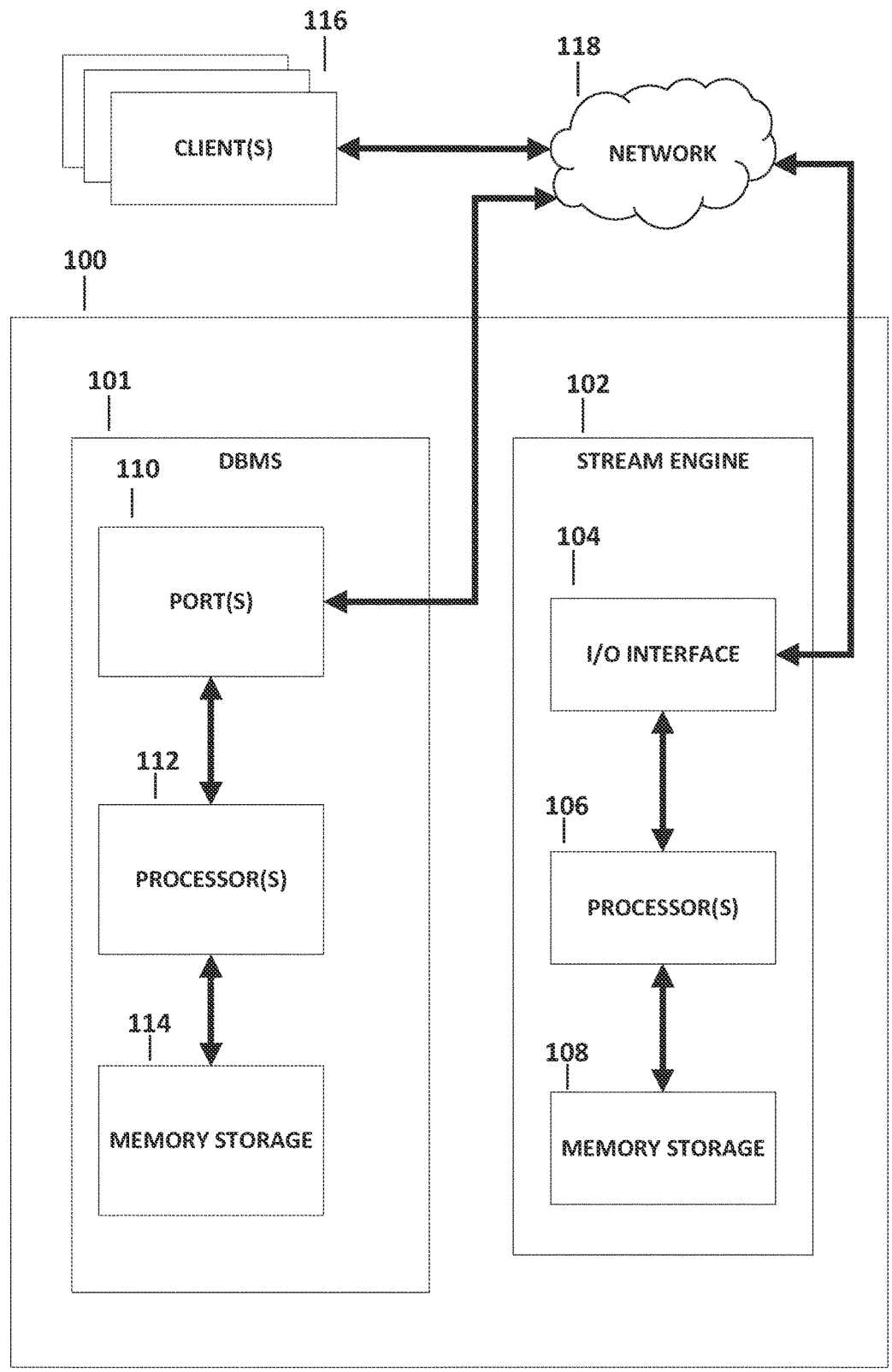
FIG. 1 is an exemplary layout of the various components of a database management system for embedded stream processing, according to some embodiments of the present disclosure.

The present disclosure, and embodiments thereof, relates, but not exclusively, to database management by embedded stream processing.

According to some embodiments of the present disclosure, there are provided database management systems and methods which manage stream processing of data to and from databases. Streaming applications often require accessing, processing and combining online dynamic data with static data stored in external in systems, such as relational databases. Databases may be present, for example, in a common physical location, or may be connected via a distributed cloud based system. Even if a database is in physical proximity to a client, repeated processing and combining data requests may often create bottlenecks as application programming interface (API) requests are time expensive.

For example, a financial institution service may require continuous access to financial data for processing and analyzing market fluctuations in real time, and in addition requires static access to historic data. Continuously accessing market database(s) via a computer network may dramatically slow down the capacity of the service to provide real time analysis.

Existing solutions for database management aimed at improving data streaming efficiency typically focus either on database management systems, stream extensions, or stream engines. Modern database management systems usually enable registering of stored procedures, which may be implemented, for example, in structured query language (SQL), as well as in Java, C, C++, or Lua. In some cases, stored procedures are user defined, however solutions aimed at improving access efficiency that focus only on stored procedures do not eliminate problems such as: streaming of large datasets, or a need for an extract, transform, load (ETL) stage for common data pipelines, both which may add significant complexity in high load environments.

Alternatively, solutions focusing on stream extensions, (for example, PipelineDB), define a form for database access which is usually refreshed after updates which take place at a data source. Stream extensions may offer advantages such as reducing size of streaming datasets, and sometimes eliminate necessity of ETL stages. However, drawbacks of stream extensions include: continuous queries must be known well in advance, and defined logic needs to be expressible in an SQL manner. In addition, continuous query processing still relies on key characteristics of database management systems.

Stream engines are another existing solution, which support management and processing of streams of data (i.e., continuous data) on the fly (i.e., upon arrival, without a need of pre-storing data before processing the data). Stream engines provide an API which represents an analytical description of streaming requirements. This description is then mapped to an execution plan specific to and uniquely mapped to the execution framework. Unlike database management systems, stream engines are typically a distributed system that will deploy the operators that form the stream topology across the stream engine nodes. Although there are database management systems that are distributed, stream engines are typically able to distribute the topology and orchestrate the processing on infrastructures 10-100 times larger than database management systems. The stream processing is obtained by flowing data through the interconnection of these operators.

In addition, stream engines may support SQL processing capabilities. However, although stream engines may substitute some of the database processing logic, they cannot entirely replace the data management offered by a database management system, which may be highly specialized for its respective computational features.

The system described herein aims to improve both data streaming efficiency and retain computational capabilities of database management systems by enabling the deployment of hybrid streaming topologies, where 'hybrid' refers to combining processing strengths of both stream engines and database management systems. This is achieved by deployment, by the stream engine, of one or more stream operator wrappers as stored procedures within a database management system. Each stream operator wrapper contains a stream operator and coded instructions that, when executed locally on the database management system, performs one or more tasks that are commonly performed by stream engines, such as accessing and processing data by using the stream operator. By executing tasks locally, computational resources may be distributed, and database computational functionality usage by the stream engine may be maximized.

Additional advantages of the system described herein in relation to existing alternatives, may include: improvement in computational costs of applications combining dynamic data with static data, savings in resources by reducing data transfer across systems, leveraging optimizations and computation capacity of the databases along data streaming processing pipelines, and extending processing capabilities of legacy databases.

The system includes a stream processing engine and one or more database management systems, enabling processing of data with a dual paradigm, combining stream processing and database relational processing. This is achieved by transferring some of the stream processing to the database management system(s) via a mechanism of stored procedure stream operators (SPSOs), which execute locally on the database management system(s) (DBMSs).

Each implemented SPSO consists of a code which wraps a stream operator (SO). An SO consists of a processing unit which usually resides within a stream engine, that may contain coded instructions to: interconnect with other SOs, receive and/or send data to other SOs, retain data, apply a processing logic/function over incoming data and/or data that is retained, and discard retained data.

The wrapping code within the SPSO executes a logic, according to a stream scheduling policy decided by the stream engine. The SO is executed by the SO wrapping code, and may contain code for executing typical streaming processing classes such as: map, flatmap, reduce, join, window, processfunction, filter, groupby, keyby, shuffle, group reduce, iterate, match, and aggregate.

In addition, the system described herein allows execution of hybrid stream topologies across stream engines and database management systems, wherein each DBMS SPSOs deployed by the stream engine(s) act as stream processing nodes, which process data locally and are able to act in coordination with each other.

Coordinating the stream processing nodes with each other may be achieved by the wrapping SO code by implementing port(s) for communication between SPSOs for coordinating the processing of streaming data according to the stream engine policy.

Before explaining at least one embodiment of the disclosure in detail, it is to be understood that the embodiments are not necessarily limited in application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network, and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Each of the described systems includes and each of the described methods is implemented using a processing circuitry configured to execute a code. The processing circuitry may comprise hardware and firmware and/or software. For example, the processing circuitry may comprise one or more processors and a non-transitory medium connected to the one or more processors and carrying the code. The code, when executed by the one or more processors, causes the system to carry out the operations described herein.

For brevity, the words 'task' and 'job' are used herein interchangeably.

Reference is now made to FIG. 1, which is a depiction of system components for embedded stream processing, and related components, according to some embodiments of the present disclosure. The system 100 is used for deployment, by a stream engine 102, of SO wrappers as SPSOs of a DBMS 101, wherein the SO wrappers execute locally some of the data processing otherwise executed by the stream engine 102. For example, the system 100 may be embodied as part of an infrastructure which provides embedded streaming services to firms which require low latency data streaming capabilities.

The stream engine 102 has an I/O interface 104, which receives streaming requests from client(s) 116, via a computer network 118, for example via a cloud network based within the world wide web and/or a local network, which is then processed by processors(s) 106 by executing a stream engine code stored in the memory storage 108. Clients may be, for example, large organizations such as financial firms, and/or private subscribers to services, such as subscribers to streaming entertainment services. The stream engine code contains instructions for managing and scheduling streaming requests by monitoring streaming requests, and deploying streaming tasks according to predetermined policies.

The policies are determined by the stream engine 102. Each policy determines a streaming plan, and may be influenced by the client(s) requirements, and the amount of streaming data traffic within the network (e.g., by monitoring network traffic by the stream engine). A streaming plan consists of deploying SO wrappers as SPSOs to the DBMS 101, and assigning streaming tasks to each SO wrapper.

The DBMS 101 receives requests for storing SPSOs via the port(s) 110, which are then processed by processor(s) 112. The processor(s) execute a DBMS code stored in the storage 114, which stores the requested SPSOs in the storage 114.

The DBMS 101 receives, via the port(s) 110 requests for execution of the SPSOs from the stream engine 102, determined by a stream engine streaming policy. Next, the processor(s) 112 executes the SPSOs requested for execution, which may access data objects within the storage 114, process the accessed data, and output the processed data via the port(s) 110. Data outputted by the SPSOs may be sent either directly to client(s) 116 or to the stream engine via the I/O interface 104.

Figure 2:
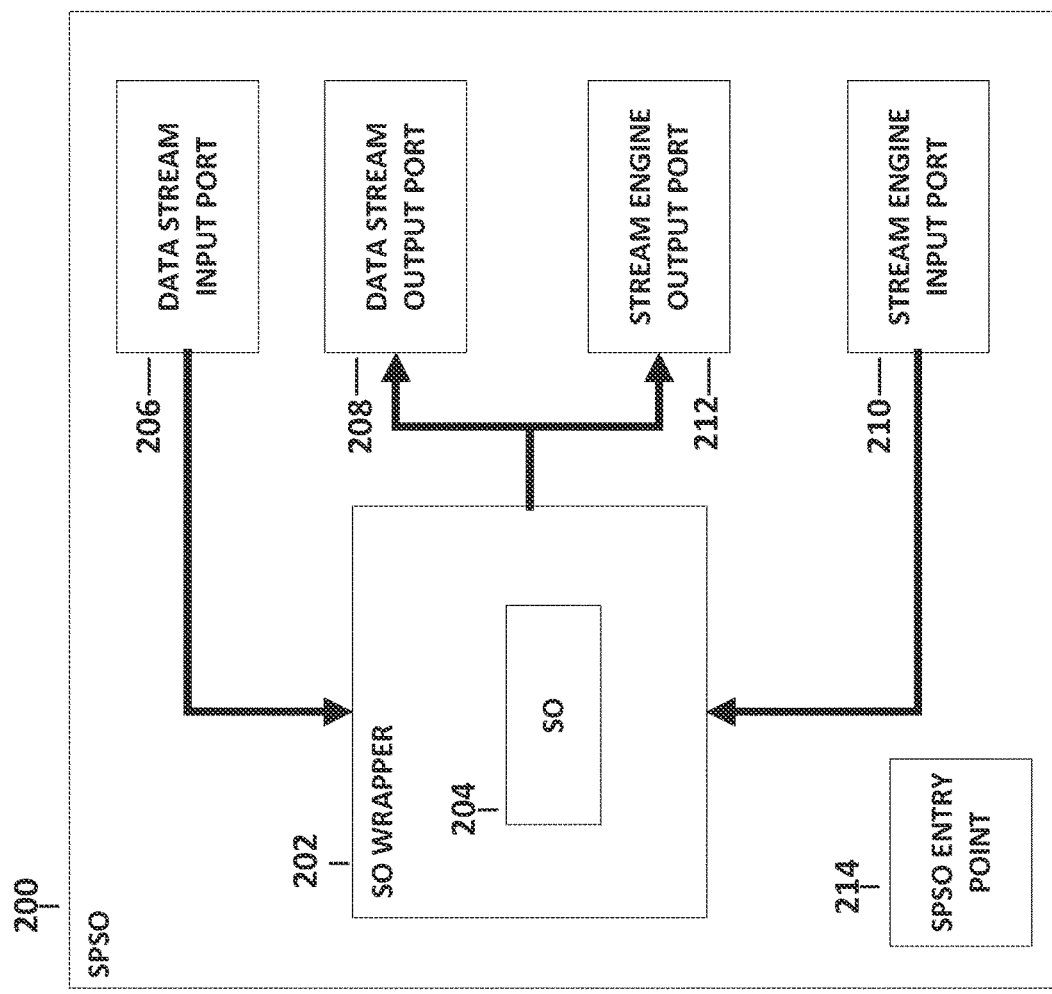
FIG. 2 is an exemplary depiction of components of a stored routine stream operator, according to some embodiments of the present disclosure.

Reference is now made to FIG. 2, which is an exemplary depiction of components of an SPSO 200, according to some embodiments of the present disclosure. SPSOs are implemented as code, and are optionally transferred to a DBMS by the stream engine via an API. The SPSO 200 contains several entry points consisting of I/O ports 206, 208, 210, 212, and a SO wrapper 202, which wraps a SO 204.

The SO wrapper contains code for implementation of the stream engine 102 streaming policies. The SO wrapper code instructs execution of queries, analysis, and export of data objects stored within the DBMS 101 by a logic defined by the code instructions. The SO wrapper code instructs execution of the queries, analysis, and access of the data by executing the SO 204.

Optionally, the SO wrapper code executes as a single thread application defining logic for processing data from the plurality of data objects, the logic may describe commonly used operators such as: map, flatmap, reduce, join, window, filter, and processfunction. Streaming efficiency may be improved because part of the stream engine functionality which may be implemented within the SO wrappers may otherwise be achieved by numerous API calls between the stream engine 102 and the DBMS 101, which are usually time expensive, and resource consuming.

Optionally, the SO 204 may consist of a user defined function. By implementing a user defined function, custom database access queries may be implemented by the stream engine 102, for niche streaming requirements in specialized streaming scenarios. Employing user defined functions may further improve streaming efficiency, as maximizing functionality of SOs executed locally may reduce overhead.

The SO wrapper 202 contains a data stream input and output ports 206, 208, which are responsible for transfer of data streams of data extracted from the DBMS 101 according to policies defined by the stream engine 102.

In addition, the SO wrapper 202 contains stream engine input and output ports 210, 212, which mediate communication of tasks between the stream engine 102 and the SO wrapper. Examples of communications include scheduling of queries, task updates, and data streaming policy changes based on data streaming requirements and/or performance, changes which may occur in real time based on streaming performance data collected by the hybrid monitor 306, processed by the hybrid policy scheduler 306, and executed by the hybrid control and deploy unit 308. For example, if the hybrid monitor detects bottlenecks, and/or a high streaming demand, then the hybrid policy scheduler may deploy more SPSOs designed to execute in parallel in order to improve streaming efficiency. An SPSO entry point 214 serves as an I/O interface between the SPSO and DBMS for accessing data stored within the DBMS memory storage 114, and for executing the SO wrapper code. The data stream input and output ports 206, 208 may be employed also to transfer data between SPSOs deployed by the stream engine 102 as part of a data streaming topology.

Figure 3:
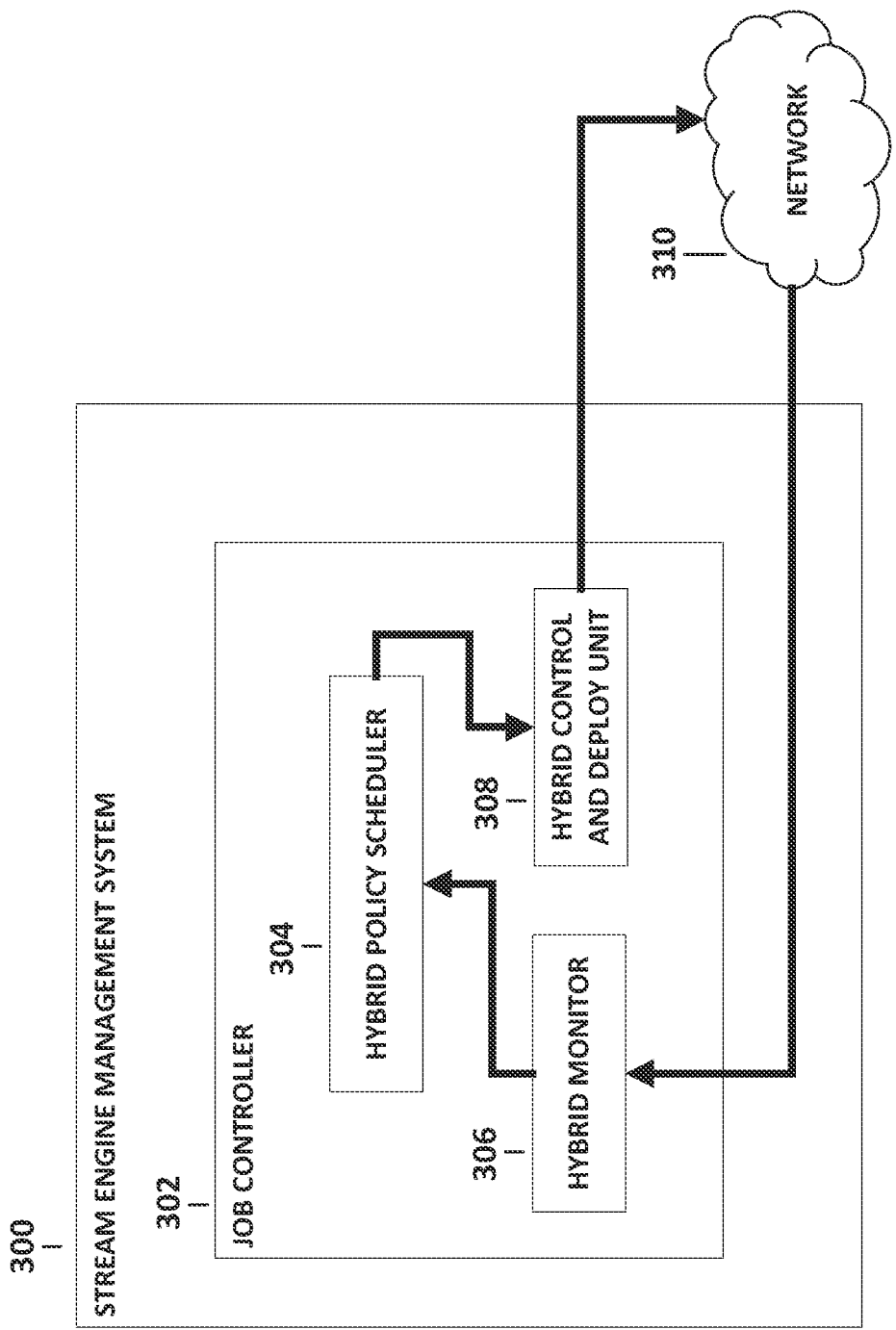
FIG. 3 is an exemplary depiction of components of a stream engine management system, according to some embodiments of the present disclosure.

Reference is also made to FIG. 3, which is an exemplary depiction of components of a stream engine management system (SEMS) 300, according to some embodiments of the present disclosure. The SEMS is implemented in the stream engine code instructions which are stored in the memory storage 108. The SEMS contains several components, a stream engine job controller 302, which contains a hybrid policy scheduler 304, a hybrid monitor 306, and a hybrid control and deploy unit 308. The hybrid policy scheduler 304 determines data streaming policies by generating a streaming data plan consisting of scheduling deployment and execution of SO wrappers to DBMS(s). The hybrid monitor 306 constantly monitors streaming data traffic within the network and periodically updates the hybrid policy scheduler with an outcome of the monitoring. The hybrid control and deploy unit 308 executes streaming data plan(s) determined by the hybrid policy scheduler. The stream engine job controller 302 contains a code, stored in the memory storage 108, who instructs execution of a process of managing a hybrid data streaming policy in order to improve efficiency of data streaming to the client(s) 116. The hybrid data streaming policy may be implemented by the stream engine 102 by a predefined stream processing plan.

The stream processing plan may include instructions for: deployment of a predetermined amount of SO wrappers to one or more DBMS, interconnecting the SO wrappers with each other, and a schedule for execution of the SO wrappers. The implementation of the stream processing plan may reflect a stream application topology, in which the SO wrappers form a network of interconnected processing nodes, each with its own tasks and schedules.

The hybrid data streaming policy may implement various predetermined streaming architectures according to requirements of the client(s) 116. One common architecture is a stream processing pipeline, which integrates data from multiple data sources, optionally, from several DBMSs. This may be implemented by deploying SO wrappers as SPSOs, by the stream engine 102, whereas the deployed SPSOs contain code instructing coordination between SPSOs in retrieving, processing, and integrating data, such that the retrieved data is streamed as an integrated pipeline. For example, the stream engine may deploy one 'integrator' SPSO whose task is to integrate data received by other deployed SPSOs, which access and process raw data retrieved from the DBMS, and the 'integrator' SPSO outputs streaming data following data integration. Optionally, the 'integrator' SPSO may be deployed multiple times as a root in multiple directed acyclic graphs (DAGs) streaming topologies, wherein each DAG respective nodes are SO wrappers stored as SPSOs, and each DAG has specific functionality assigned by the stream engine according to a stream processing plan.

In addition, the stream engine job controller monitors streaming data using the hybrid monitor 306, which monitors streaming data traffic received via the network 310 (which may be the same network). The performance of the streaming data is analyzed by the hybrid policy scheduler 304, by estimating streaming performance, optionally by using statistical models of streaming performance over time. Based on an outcome of the analysis, the hybrid policy scheduler may decide upon updating a scheduling plan, which is then executed by the hybrid control and deploy unit 308 by deployment of additional SPSOs and/or sending updated instructions to previously deployed SPSOs which are located within the DBMS 101.

Figure 4:
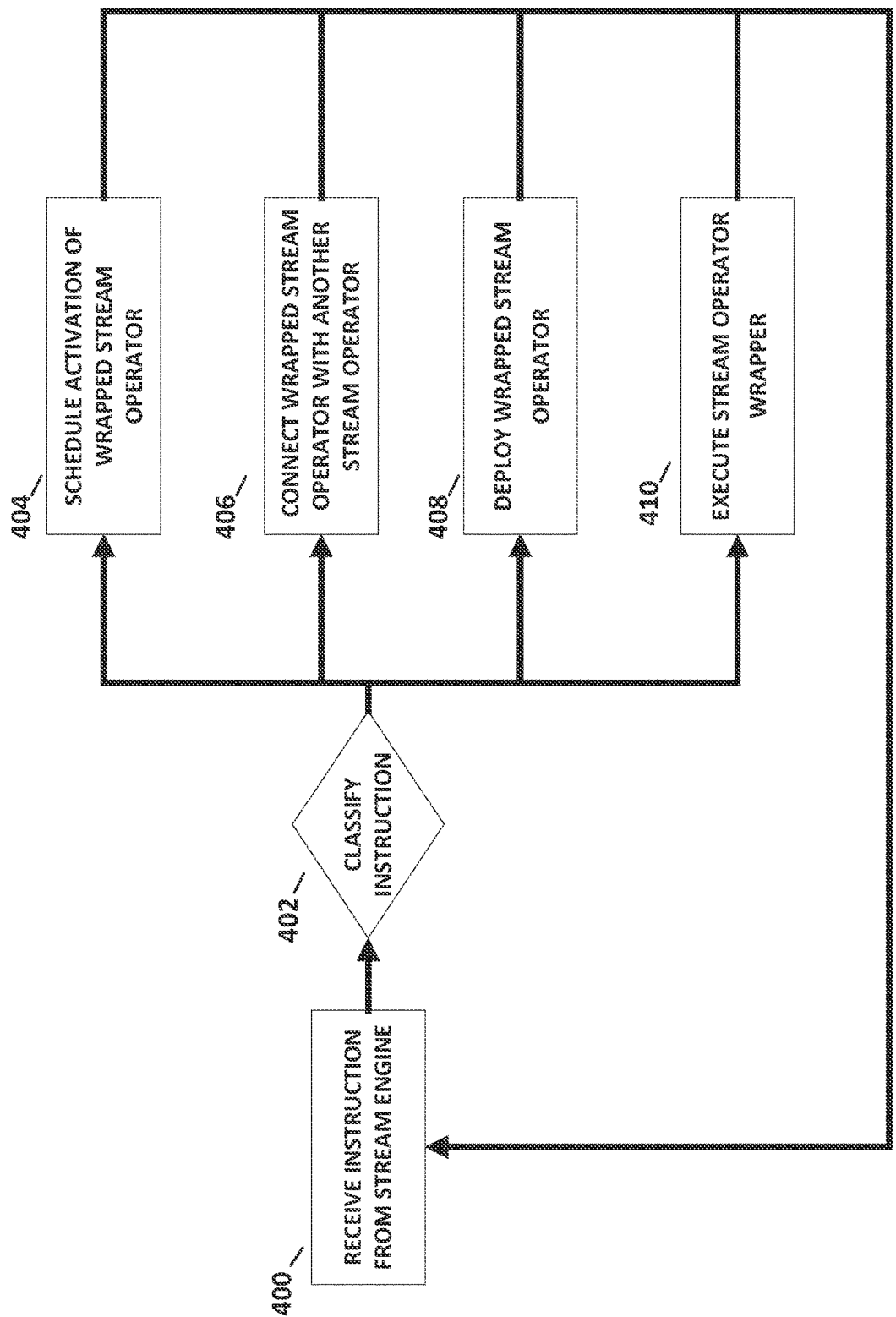
FIG. 4 is an exemplary dataflow of a process of executing an instruction received from a stream engine, by a stored routine stream operator, according to some embodiments of the present disclosure.

Reference is also made to FIG. 4, which is an exemplary depiction of a process of executing instructions received from a stream engine by an SPSO, according to some embodiments of the present disclosure. The process is executed upon execution of streaming plans by the hybrid control and deploy unit 308, and/or for updating streaming plans during execution (for example, in cases where the hybrid policy scheduler 306 decides to alter a streaming policy following updates received from the hybrid monitor 304). The process is executed for initiating and controlling data streaming through the SPSOs deployed within a DBMS by the stream engine.

In use, as shown in 400, an SPSO receives an instruction from the stream engine via the input port 212. Next, as shown in 402, the instruction is classified to one of several options as seen in 404,406,408, and 410. As shown in 404, the instruction may be a scheduled activation of the respective wrapped stream operator. The scheduled activation is instructed by the hybrid control and deploy unit 308, according to a policy decided by the hybrid policy scheduler 304. Optionally, as shown in 406, the instruction may be to connect the wrapped stream operator with another stream operator. This instruction may be received, for example, in a process of constructing a streaming topology consisting of several SO wrappers within the DBMS 101, or deploying interconnecting SO wrappers across several DBMSs, according to a streaming policy as determined by the SEMS 300, for a purpose of improving streaming efficiency by distributing different types of parallelizable tasks between SO wrappers.

As shown in 408, the instruction may be to deploy the respective wrapped stream operator within the DBMS 101. This means that the SPSO may be initially inactive as a SO wrapper, and only after receiving a respective instruction from the stream engine 102, the SO wrapper is deployed as an SO within the DBMS 101. This may reduce load on the DBMS 101, as different streaming schedules may require different active SPSOs.

As shown in 410, the instruction may be to execute the SO wrapper. According to some embodiments of the present disclosure, several SO wrappers may be instructed to execute simultaneously for processing a data flow of a common thread. This may speed up computations within the DBMS, in comparison to execution of SO wrappers in a serial manner, if the SO wrappers are assigned parallelizable tasks by the stream engine 102.

Figure 5:
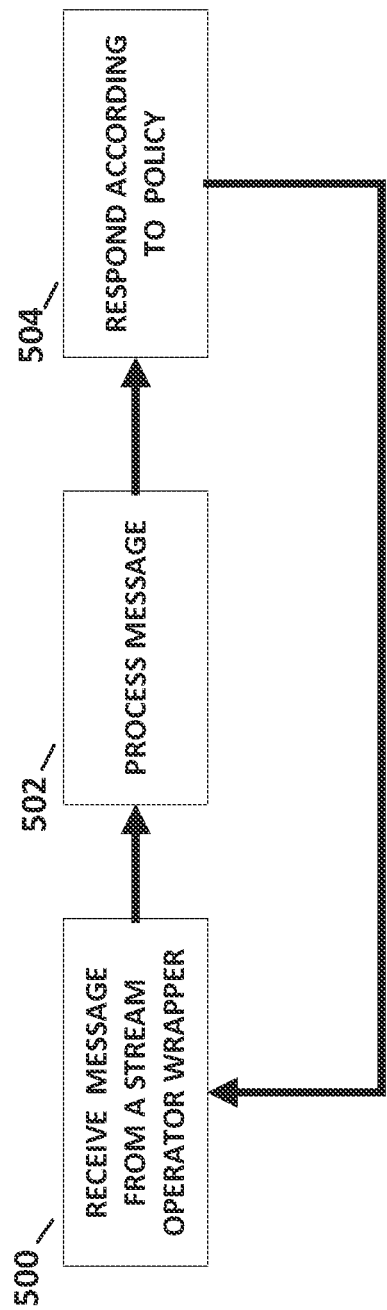
FIG. 5 is an exemplary dataflow of a process of executing a policy by a stream engine, based on a message originating from a stream operator wrapper, according to some embodiments of the present disclosure.

Reference is also made to FIG. 5, which is an exemplary depiction of a process of executing a policy by a stream engine, based on a message originating from a SO wrapper, according to some embodiments of the present disclosure.

As shown in 500, the SEMS 300, located within the stream engine 102, receives a message from an SO wrapper. The message may consist of updates regarding tasks executed by the SO wrapper, for example, completion of tasks, errors, and status updates in response to instructions executed, as depicted in FIG. 4. Next, as shown in 502, the message is processed by the SEMS in order to calculate a response according to a policy associated with the received message. The hybrid policy scheduler 304 may decide, based on the received message content, how to proceed regarding a policy, and whether to alter the policy. Optionally the hybrid policy scheduler 304 may also take into account updates received from the hybrid monitor 306 in calculating a response. Next, as shown in 504, a response is executed according to the processing of the message. The hybrid policy scheduler 304 assigns a response to be executed by the hybrid control and deploy unit 308, which executes an action based on the response via the network 310, by either deploying SPSOs and/or sending instructions to deployed SPSOs as depicted in FIG. 4

Figure 6:
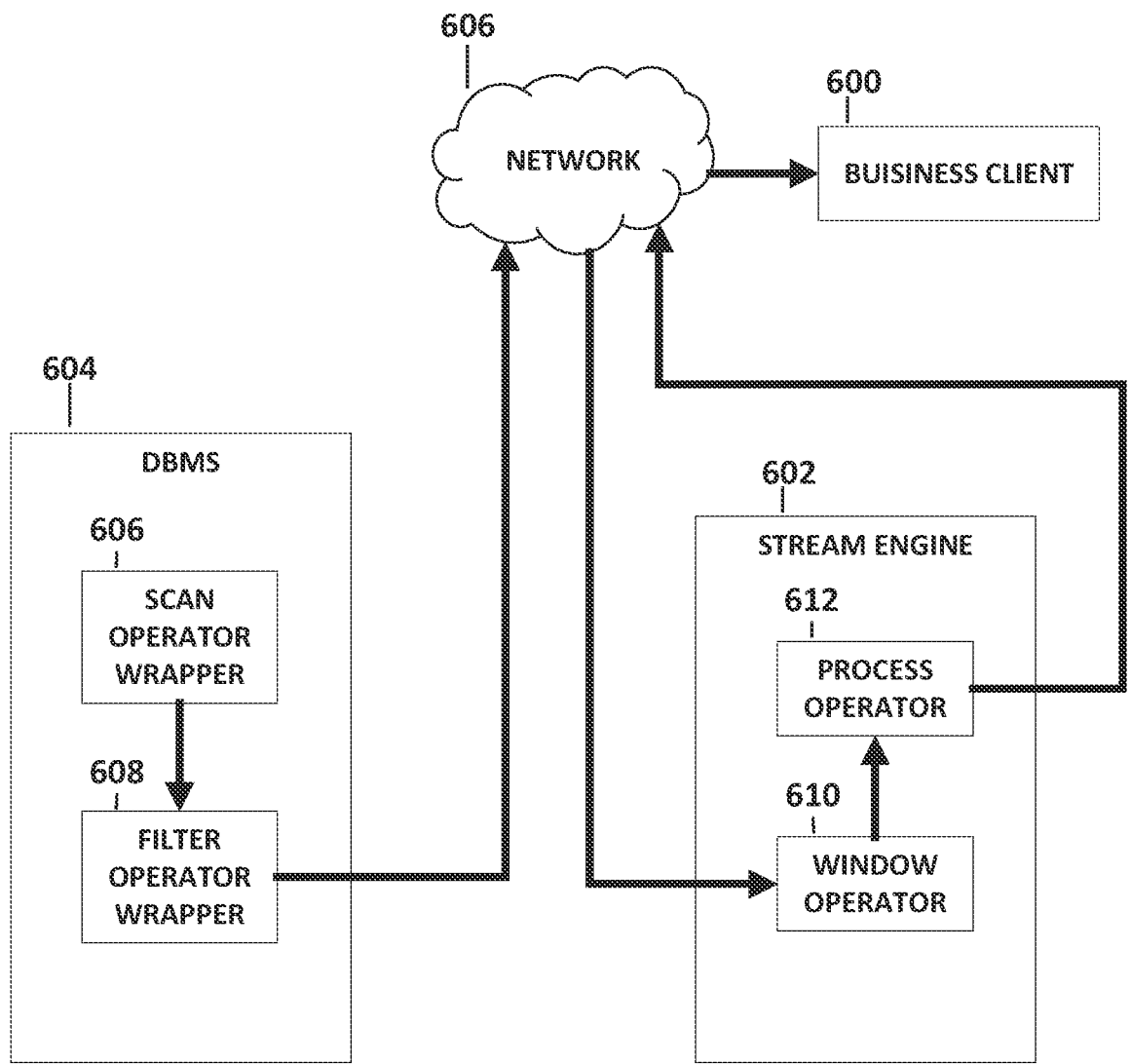
FIG. 6 is an exemplary depiction of dataflow within a stream processing topology, according to some embodiments of the present disclosure.

Reference is also made to FIG. 6, which is an exemplary depiction of dataflow within a stream processing topology, according to some embodiments of the present disclosure.

As an example of an implementation of the system described herein, a business client 600 requires an application for processing of employees names and salaries which are stored within a DBMS 604 which are both connected to a network 606. A service provider provides the business client a stream engine 602 which implements four stream operator wrappers connected as a linear DAG in the following order: a scan operator wrapper 606, a filter operator wrapper 608, a window operator 610, and a process operator 612. The scan operator wrapper activates a scan operator which reads data from the DBMS memory storage, the filter operator wrapper activates a filter operator which discards data which is not relevant to the business client requirements, the window operator activates a window operator which executes a sliding window filter for a predefined time slice, and the process operator processes the remaining data which is outputted to a server of the business client. The scan operator wrapper and the filter operator wrapper are deployed by the stream engine as SPSOs within the DBMS, while the window operator and the process operator are stored within the stream engine, such that the processing of data is implemented as a hybrid streaming topology. The SO wrappers process raw retrieved data stored within the DBMS, and the stream engine processes the retrieved data according to temporal constraints and the business client processing requirements. This topology may improve adaptability and computational efficiency of the service provider, for example, the stream engine may adapt to changing requirements of the business client by deployments of additional scan and/or filter operators to the DBMS or additional DBMSs. Additional adaptations that may be easily implemented by this topology include: altering the window operator for larger/smaller time slices, and/or altering the process operator for changing business client requirements, as the window and process operators reside only in the stream engine.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term database management system is intended to include all such new technologies a priori. As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A database management system, comprising:
   a memory having the following stored thereon:
      a plurality of data objects organized according to a data model, and
      a plurality of stream operator wrappers, wherein each of the plurality of stream operator wrappers wraps a stream operator and has at least one port, wherein the at least one port is configured to receive, via a network, instructions from a remote stream engine, wherein the instructions are determined by the remote stream engine based on a plurality of messages from the plurality of stream operator wrappers, and wherein the instructions comprise at least one of scheduling activation of the wrapped stream operator, connecting the wrapped stream operator with another stream operator wrapped by another of the plurality of stream operator wrappers, and deploying the wrapped stream operator, and wherein the at least one port comprises at least one output port for outputting data to the remote stream engine, wherein the remote stream engine schedules operation of a plurality of stream operators wrapped in the plurality of stream operator wrappers; and
   a processor configured to execute the plurality of stream operator wrappers, wherein the processor is configured to execute at least two of the plurality of stream operator wrappers simultaneously for processing a data flow of a common thread.

2. The database management system of claim 1, wherein each of the plurality of stream operator wrappers includes an entry point for receiving a data flow from another of the plurality of stream operator wrappers which is interconnected thereto.

3. The database management system of claim 1, wherein the stream operator is a member of a group consisting of the following operators: map, flatmap, reduce, join, window, filter, processfunction, groupby, keyby, shuffle, group, iterate, match, and aggregate.

4. The database management system of claim 1, wherein the database management system is part of a distributed stream processing pipeline.

5. The database management system of claim 1, wherein the processor executes each of at least two of the plurality of stream operator wrappers for combining a logic defined by the respective stream operator and at least two of the plurality of data objects.

6. The database management system of claim 1, wherein the instructions are received for implementing a stream processing pipeline integration.

7. The database management system of claim 1, wherein the instructions are received to control a job execution for enabling coordination and distribution of jobs according to a stream processing plan.

8. The database management system of claim 7, wherein the stream processing plan causes the processor to build a stream application topology.

9. The database management system of claim 1, wherein the stream operator is a single thread application defining logic for processing data from the plurality of data objects.

10. The database management system of claim 1, wherein the stream operator is a user defined function.

11. The database management system of claim 1, wherein the at least one port comprises at least one output port for outputting data to the remote stream engine, wherein the remote stream engine supervises the execution of the respective stream operator.

12. A stream engine, comprising:
   an interface in communication, via a network, with a remote database management system, wherein the interface is configured to receive a plurality of messages from a plurality of stream operator wrappers executed on the remote database management system, wherein the remote database management system comprises a memory having a plurality of data objects and the plurality of stream operator wrappers stored thereon, and wherein each of the plurality of messages is indicative of an outcome of executing a stream operator wrapped by one of the plurality of stream operator wrappers, and wherein the stream engine schedules operation of a plurality of stream operators wrapped in the plurality of stream operator wrappers; and a processor configured to execute a policy for scheduling or interconnecting at least some of a plurality of stream operators wrapped in the plurality of stream operator wrappers according to data in the plurality of messages, and to send instructions to the remote database management system based on the executed policy, wherein the processor is configured to execute at least two of the plurality of stream operator wrappers simultaneously for processing a data flow of a common thread.

13. The stream engine of claim 12, wherein the processor is configured to instruct a deployment of one or more of the plurality of stream operators by sending an indication to one or more of the plurality of stream operator wrappers via the network.

14. A system, comprising:
a stream engine; and
a database management sub-system comprising a processor and a memory having the following stored thereon:
  a plurality of data objects organized according to a data model; and
  a plurality of stream operator wrappers, wherein each of the plurality of stream operator wrappers wraps a stream operator and has at least one port;
wherein at least two of the plurality of stream operator wrappers are executed by the processor based on instructions, wherein the instructions are received through the at least one port from the stream engine via a network, wherein the instructions are determined by the stream engine based on a plurality of messages from the plurality of stream operator wrappers, and wherein the instructions comprise at least one of scheduling activation of the wrapped stream operator, connecting the wrapped stream operator with another stream operator wrapped by another of the plurality of stream operator wrappers, and deploying the wrapped stream operator, and wherein the at least one port comprises at least one output port for outputting data to the stream engine, wherein the stream engine schedules operation of a plurality of stream operators wrapped in the plurality of stream operator wrappers, wherein the processor is configured to execute at least two of the plurality of stream operator wrappers simultaneously for processing a data flow of a common thread.

15. The system of claim 14, wherein each of the plurality of stream operator wrappers includes an entry point for receiving a data flow from another of the plurality of stream operator wrappers which is interconnected thereto.

16. The system of claim 14, wherein the stream operator is a member of a group consisting of the following operators: map, flatmap, reduce, join, window, filter, processfunction, groupby, keyby, shuffle, group, iterate, match, and aggregate.

17. The system of claim 14, wherein the database management sub-system is part of a distributed stream processing pipeline.

* * * * *